(12) United States Patent
Bennett

(10) Patent No.: US 7,689,873 B1
(45) Date of Patent: Mar. 30, 2010

(54) SYSTEMS AND METHODS FOR PRIORITIZING ERROR NOTIFICATION

(75) Inventor: Victor Bennett, Berkeley, CA (US)

(73) Assignee: Google Inc., Mountain View, CA (US)

( * ) Notice: Subject to any disclaimer, the term of this patent is extended or adjusted under 35 U.S.C. 154(b) by 617 days.

(21) Appl. No.: 11/230,713

(22) Filed: Sep. 19, 2005

(51) Int. Cl.
*G06F 11/00* (2006.01)
(52) U.S. Cl. .............................. 714/48; 705/5; 705/415
(58) Field of Classification Search ................... 714/48; 705/5, 415
See application file for complete search history.

(56) References Cited

U.S. PATENT DOCUMENTS

| | | | |
|---|---|---|---|
| 5,317,503 A * | 5/1994 | Inoue | 700/90 |
| 5,745,384 A * | 4/1998 | Lanzerotti et al. | 702/191 |
| 6,232,974 B1 * | 5/2001 | Horvitz et al. | 345/419 |
| 6,578,001 B1 * | 6/2003 | Schramek | 705/1 |
| 7,203,622 B2 * | 4/2007 | Pan et al. | 702/184 |

(Continued)

OTHER PUBLICATIONS

Agbaria, A.M., et al., , "Starfish: fault-tolerant dynamic MPI programs on clusters of workstations," *Proceedings of the Eighth International Symposium on High Performance Distributed Computing*, 1999, pp. 167-176.

(Continued)

*Primary Examiner*—Scott T. Baderman
*Assistant Examiner*—Loan Truong
(74) *Attorney, Agent, or Firm*—Sterne, Kessler, Goldstein & Fox PLLC

(57) ABSTRACT

Errors occurring in computing clusters and other computing systems can impact system performance. Each error has an error type and each error type has a base cost estimating importance of correcting the error. Each error type also has a confidence indicating the level of agreement between those who fix the errors and those who assigned the base cost. An error type's actual cost is produced using the base cost and confidence. An error cascade map contains estimates that one error will cause another. An error type that causes other error types has a cascade cost. Upon detecting an error type, a repair order can be generated, depending on the cost involved. Repairs are then performed. Feedback mechanisms and correlations can be used to update the confidences and the error cascade map.

22 Claims, 6 Drawing Sheets

U.S. PATENT DOCUMENTS

| | | | |
|---|---|---|---|
| 7,269,474 B1* | 9/2007 | Knipfer et al. | 700/219 |
| 2003/0040924 A1* | 2/2003 | Spoke et al. | 705/1 |
| 2003/0079154 A1* | 4/2003 | Park et al. | 714/1 |
| 2003/0149927 A1* | 8/2003 | Wang | 714/738 |
| 2003/0154432 A1* | 8/2003 | Scott et al. | 714/724 |
| 2003/0182276 A1* | 9/2003 | Bossman et al. | 707/3 |
| 2003/0188228 A1* | 10/2003 | Davis et al. | 714/43 |
| 2003/0191606 A1* | 10/2003 | Fujiyama et al. | 702/185 |
| 2004/0034456 A1* | 2/2004 | Felke et al. | 701/29 |
| 2004/0236676 A1* | 11/2004 | Takezawa et al. | 705/38 |
| 2004/0243423 A1* | 12/2004 | Rix et al. | 705/1 |
| 2004/0249602 A1* | 12/2004 | Gomez et al. | 702/181 |
| 2005/0021311 A1* | 1/2005 | Deb et al. | 702/188 |
| 2005/0071331 A1* | 3/2005 | Gao et al. | 707/4 |
| 2005/0114743 A1* | 5/2005 | Moorhouse | 714/100 |
| 2005/0177341 A1* | 8/2005 | Wada | 702/183 |
| 2005/0192963 A1* | 9/2005 | Tschiegg et al. | 707/9 |
| 2005/0209841 A1* | 9/2005 | Arning et al. | 703/22 |
| 2005/0289089 A1* | 12/2005 | Abe et al. | 706/12 |
| 2006/0036558 A1* | 2/2006 | Mathews | 705/414 |
| 2006/0064393 A1* | 3/2006 | Orr | 705/400 |
| 2006/0161819 A1* | 7/2006 | Nissan-Messing et al. | 714/48 |
| 2006/0259277 A1* | 11/2006 | Fantana et al. | 702/183 |
| 2007/0083398 A1* | 4/2007 | Ivey et al. | 705/4 |

OTHER PUBLICATIONS

Tierney, B., et al., "A monitoring sensor management system for grid environments," *Proceedings of the Ninth International Symposium on High-Performance Distributed Computing*, 2000, pp. 97-104.

\* cited by examiner

| Error Cascade Map 916 |||
|---|---|---|
| Causing Error 901 | Resulting Error 902 | Cascade Probability 903 |
| Error1 904 | Error2 905 | 0.20 906 |
| Error2 907 | Error3 908 | 0.05 909 |
| Error1 910 | Error3 911 | 0.70 912 |
| Error3 913 | Error2 914 | 0.10 915 |

SYSTEMS AND METHODS FOR PRIORITIZING ERROR NOTIFICATION

TECHNICAL FIELD

Embodiments relate to the fields of computing systems, massively parallel computing systems, and compute clusters. Embodiments also relate to using the cost of an error to prioritize error notifications or repair orders. Embodiments additionally relate to producing and updating actual and cascade costs.

BACKGROUND

The quest to produce more powerful computer systems has led to the development of massively parallel computing systems such as compute clusters. Compute clusters are produced by linking many computers to a communications network so that the computers can communicate with each other. A large task can be broken up into many smaller tasks. The smaller tasks can then be distributed among the many computers. The results of the smaller tasks can then be assembled to produce the result of the large task. In this manner, a large task that a single computer would take years to perform can be performed in minutes or seconds by a cluster of thousands of computers.

FIG. 10, labeled as "prior art", illustrates a computing system. Many computers 1001 are connected to a communications network 1002 through which one computer 1001 can communicate to another computer 1001. The system illustrated is essentially no different than any group of networked computers 1001. A compute cluster is a group of networked computers 1001 that cooperate by performing smaller tasks as part of completing a bigger task.

One of the problems with compute clusters is that the individual computers or other components can break. A person using a single computer can experience a few breakdowns or errors a month. With many computers, the number of breakdowns is multiplied. Large compute clusters almost always have at least one failing or broken component. Early clusters required a person to monitor the individual computers and the communications network. Breakdowns were repaired as they were found.

Modern compute clusters often contain an error detection module. An error detection module is a task that can be distributed among computers in the cluster. The error detection module can examine the computers in the cluster, the communications network joining the computers, and even the other tasks being performed. When the error detection module finds an error, it reports the error.

Using current technology, the error detection module can alert a person, typically called a systems administrator or engineer, that the error occurred and where the error occurred. The system engineer then decides whether or not to repair the cluster to remove the error. In large clusters, the system engineer can be inundated with alerts. One single error can generate a series of alerts because the error detection module detects the error at a regular interval. Some errors, called causing errors, cause other errors, called resulting errors. Some resulting errors are also causing errors because they result in yet more errors. For example, a first error can cause a second error. The second error can cause a third error. All of these errors can produce alerts.

Over time, a system engineer can deduce which errors to ignore and which errors require prompt attention. The system engineer's deduction, however, is not always reliable. Furthermore, one engineer's deductive process does not always transfer well to another engineer.

Based on the foregoing, it can be appreciated that in order to overcome the shortcomings of the current methods and systems a need exists for an improved method and system for prioritizing the errors in a compute cluster and alerting system engineers.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore one aspect of the embodiments to overcome the shortcomings in current technology by associating a base cost and a confidence with each one of at least one error type that can impact the performance of a computing system such that an actual cost for each one of the at least one error type can be produced using the associated base cost and the associated confidence. An error type is a single specific error that can occur within the computing system. It can specify the error and the location of the error. For example, "disk drive 3 of computer 512 has failed" can be an error type. The base cost of an error type is a measure of its effect. Returning to the example, if computer 512 is not used and considered scrap, then the base cost can be low, perhaps zero. If the data on disk drive 3 of computer 512 is critical, then the base cost can be quite high. The confidence of an error type indicates the degree to which the base cost is accurate. Returning to the example, the failing disk drive may once have held crucial data, but no longer does because the computer is scheduled to be replaced. The base cost was originally quite high and remains quite high, but is no longer accurate. In this case, the confidence is low. An actual cost can be produced from the base cost and the confidence. For example, the actual cost can be the base cost multiplied by the confidence.

Another aspect of the embodiments is to detect the occurrence of error types. A detected error results when an error type occurs and the occurrence is detected. As such, a detected error has an error type and can also have a timestamp indicating when the occurrence is detected. The detected error can then be used to update a detected error collection. For example, the detected error can be added to the detected error collection. Alternatively, if the detected error collection already contains the detected error's error type, then the detected error can be discarded.

Yet another aspect of the embodiments is to create repair orders that can result in repairs to the computing system. Returning to the example, a detected error indicates that a disk drive is failing. A repair order can request that the failing disk drive be fixed. The act of fixing the failing disk drive is an example of a repair. As such, there is an association between detected errors, repair orders, and repairs. After the repair is performed, the detected error collection can be updated by removing the detected error, or errors, that led to the repair. The repair must also be detected. One way to detect an error is by receiving a repair report. If a person performs the repair, then that person can submit a repair report. Similarly, if a computer, robot, or other entity performs the repair, that entity can submit a repair report. Another possibility is that anyone noticing or confirming the repair can submit a repair report. A further possibility is that the repair can be detected automatically. For example, a repair can be assumed when an error type is no longer detected. Additionally, a repair can be automatically watched for because a repair order was submitted and the error type is known. A person, entity, or module can keep a list of outstanding repair orders and monitor the associated error types.

A further aspect of the embodiments is to submit repair orders for the most important error types and not for less important error types. As mentioned previously, there can be a massive number of detected errors. The actual cost of each detected error can indicate the importance of performing the repair. A cascade cost can also be used to indicate the importance of performing the repair.

An error cascade occurs when one error type causes other error types. An error type can have a cascade cost that is found by combining the actual costs of all the cascaded error types. A further complication is that a first error type can cause a second error type with a certain probability. For example, a failing disk drive can cause a complete computer failure half the time. The cascade cost of a failing disk can be calculated as the actual cost of the failing disk plus half the actual cost of a complete computer failure.

An aspect of an embodiment is to produce an error cascade map that contains estimates of the probability that one error will lead to another. The cascade map and the actual costs of the error types can be used to find the cascade costs of the error types.

It is also an aspect of an embodiment to update the error cascade map from the detected errors. When a first error type occurs, the error types that occur later might be caused by the first error. Error correlations can be maintained to find the probability that a first error causes a second error. Error correlations must be time weighted because, statistically speaking, every error occurs eventually. For example, every computer will eventually fail. It is improper to assume that every error type that preceded the failure caused the failure. However, it is proper to assume that some of those error types might have caused the failure. A common assumption is to assume that error types that occur shortly before other error types are more likely to have caused those other error types. Those skilled in the art of statistics know many ways to correlate events, such as the occurrence of error types, to produce correlations. They also know techniques for time weighting the events while developing correlations. The correlations can be used to develop or maintain an error cascade map. The probabilities contained in the error cascade map can be simple numbers, such as 0.33, or can be functions of time.

Another aspect of an embodiment is to correlate the submission of repair orders and the performance of repairs. When an error type results in submission of a repair order and the repair is then performed immediately, then the error type itself is probably quite important. In this case, the confidence associated with the error type can be increased. If the repair is performed much later, or never, then the error type is probably unimportant and the confidence can be lowered. In this manner, the actual costs of the error types can be adjusted to approximate the values held by the system engineers who perform the repairs. A correlation based on the elapsed time from repair order to repair performance is an example of a time to repair metric. It is also possible to simply adjust the base cost. Changing the confidence, however, can reveal the level of agreement between the system engineers and whoever set the base costs.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Overview

Errors occurring in computing clusters and other computing systems can impact system performance. Each error has an error type and each error type has a base cost estimating importance of correcting the error. Each error type also has a confidence indicating the level of agreement between those who fix the errors and those who assigned the base cost. An error type's actual cost is produced using the base cost and confidence. An error cascade map contains estimates that one error will cause another. An error type that causes other error types has a cascade cost. Upon detecting an error type, a repair order can be generated, depending on the cost involved. Repairs are then performed. Feedback mechanisms and correlations can be used to update the confidences and the error cascade map.

Architectural Overview

Figure 1:
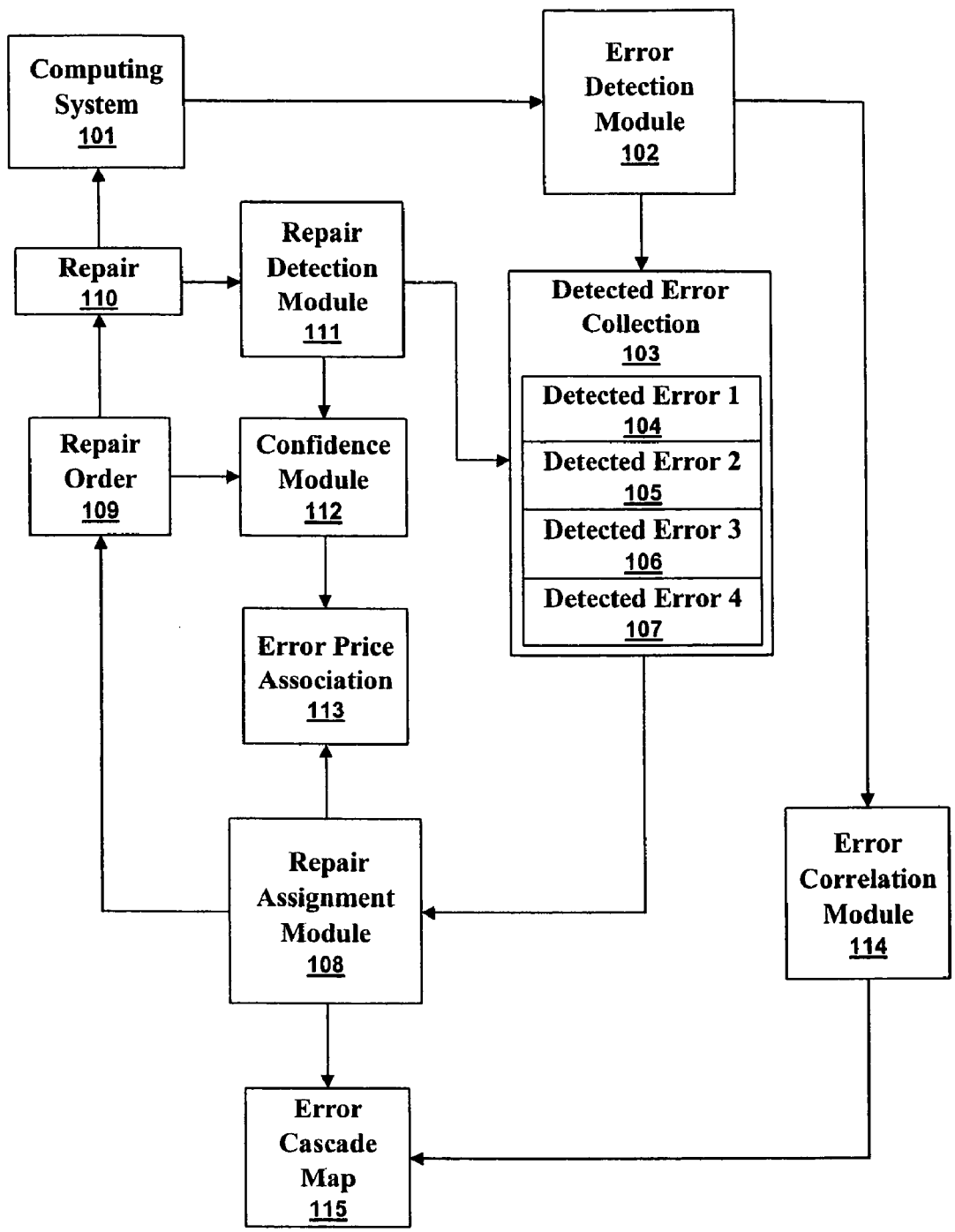
FIG. 1 illustrates a high level block diagram of a system that detects error types, orders repairs, and detects repairs in accordance with aspects of the embodiments.

FIG. 1 illustrates a high level block diagram of a system that detects error types, orders repairs, and detects repairs in accordance with aspects of the embodiments. Error types occur in a computing system 101 that cause reduced performance levels. An error detection module 102 can detect the occurrence of an error type because system errors usually produce error messages or other diagnostic information. Detecting an error type's occurrence results in a detected error that can be used to update a detected error collection 103. The detected error collection 103 contains detected errors, such as detected error 1 104, detected error 2 105, detected error 3 106, and detected error 4 107. The detected errors in the detected error collection 103 are error type occurrences that have been previously detected. A repair assignment module 108 interrogates the detected error collection 103 and uses an error price association 113 to determine the actual cost of the detected errors in the detected error collection 103. The repair assignment module 108 can also interrogate an error cascade map 115 to find the cascade cost of the detected errors in the detected error collection 103.

The repair assignment module 108 uses the costs, actual or cascade, to determine which detected errors are most important and which detected errors are important enough for a repair order 109 to be submitted. The repair assignment module 108 submits a repair order 109 to the system engineers (not shown) or whatever other entities can fix the computing system 101 by producing a repair 110.

A repair detection module 111 detects the repair 110 as discussed above and updates the detected error collection 103 because each repair should result in fixing the cause of at least one error type. As such, the detected error associated with the error type can be removed from the detected error collection 103.

The repair detection module 111 can also report the repair 110 to a confidence module 112. The confidence module 112 correlates repair orders 109 and repairs 110 and updates the confidences associated with the error types in the error price association 113.

An error correlation module 114 can receive the detected errors from the error detection module 102 and correlate the occurrences of the error types. It can use the detected error correlations to update the error cascade map 115.

The modules, collections, maps, and associations, and other elements illustrated in FIG. 1 are shown outside the computing system 101, but can be inside it as well as outside it.

High Level Process Flow

Figure 2:
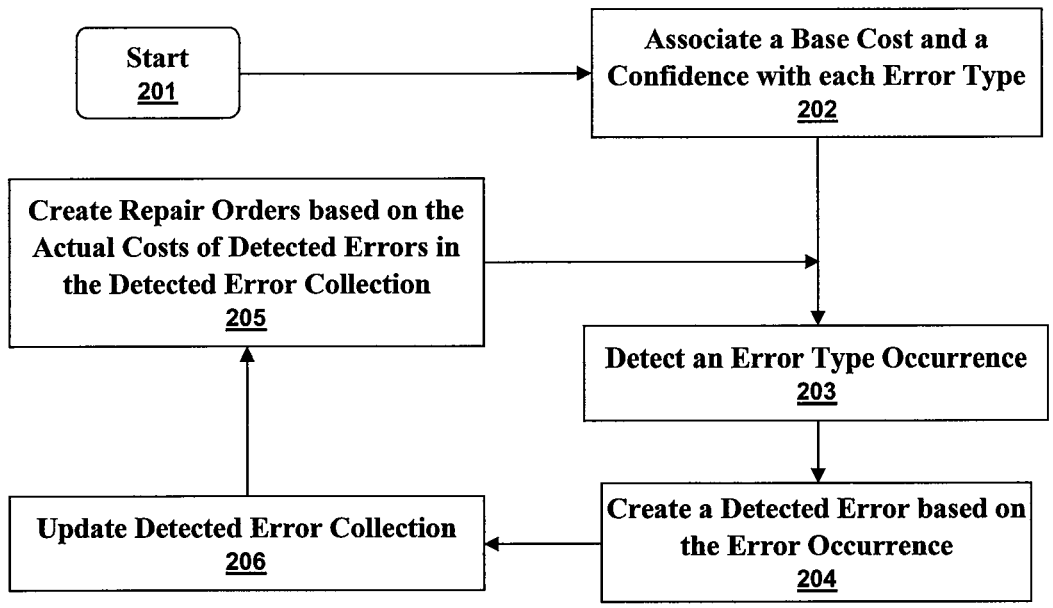
FIG. 2 illustrates a high level flow diagram of detecting errors and submitting repair orders in accordance with aspects of the embodiments.

FIG. 2 illustrates a high level flow diagram of detecting errors and submitting repair orders in accordance with aspects of the embodiments. After the start 201 a base cost and a confidence is associated with each error type 202. When an error type occurrence is detected 203, a detected error is created based on the error type that occurred 204 and then used to update the detected error collection 206. Repair orders are created based on the detected errors in the detected error collection 205. The process then loops back to detecting the occurrence of an error type 203. The issuance of repair orders 205 can also be performed in a separate process flow.

Figure 3:
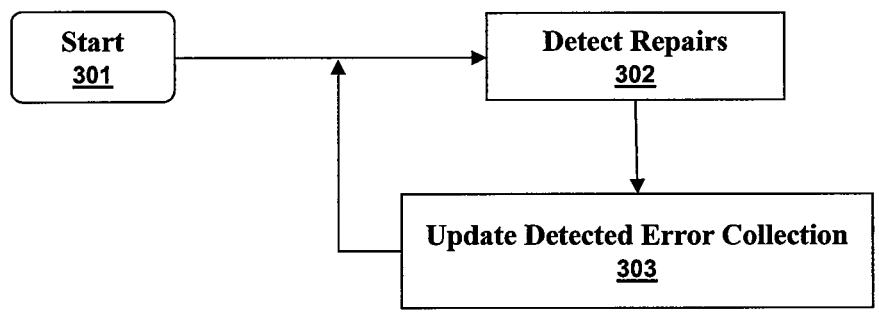
FIG. 3 illustrates a high level flow diagram of detecting repairs and updating a detected error collection in accordance with aspects of the embodiments.

FIG. 3 illustrates a high level flow diagram of detecting repairs 302 and updating a detected error collection 303 in accordance with aspects of the embodiments. As discussed above, repairs can be detected when a repair is reported, via inference, or by monitoring. Regardless of how a repair is detected, the detected error collection should be updated so repair orders are not issued for an error type occurrence that has been corrected. The process repeats by going back to detecting errors 302.

Figure 4:
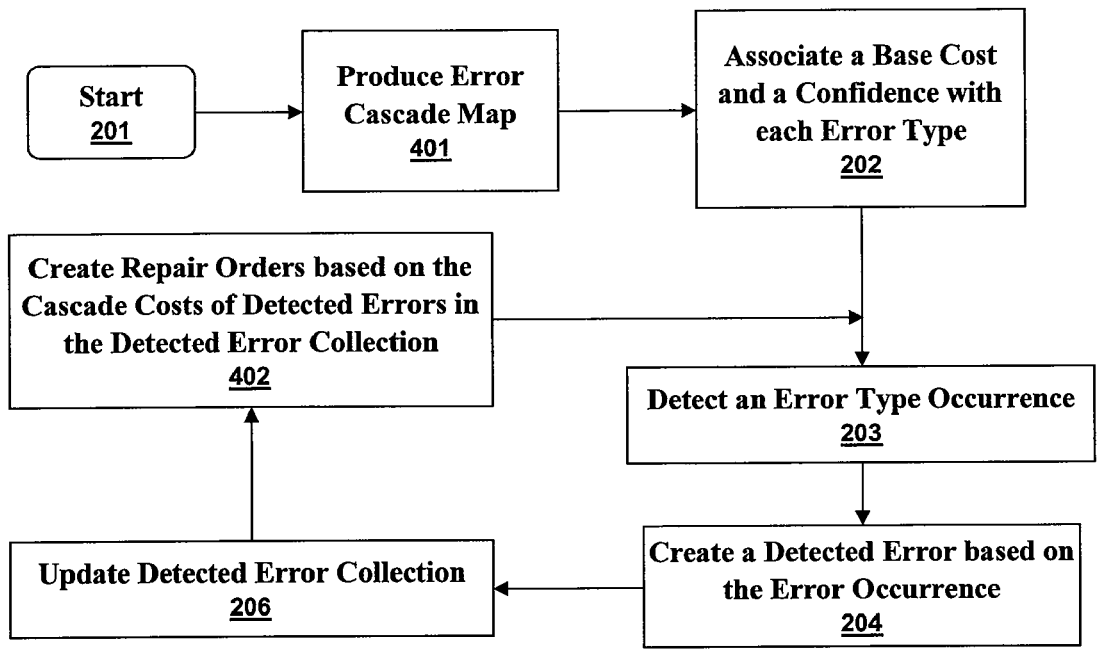
FIG. 4 illustrates a high level flow diagram of detecting errors and submitting repair orders in accordance with aspects of the embodiments.

FIG. 4 illustrates a high level flow diagram of detecting errors and submitting repair orders in accordance with aspects of the embodiments. FIG. 4 differs from FIG. 2 in only two areas. A cascade map is produced 401 after the start 201 and repair orders are created based on cascade costs 402 rather than actual costs.

Figure 5:
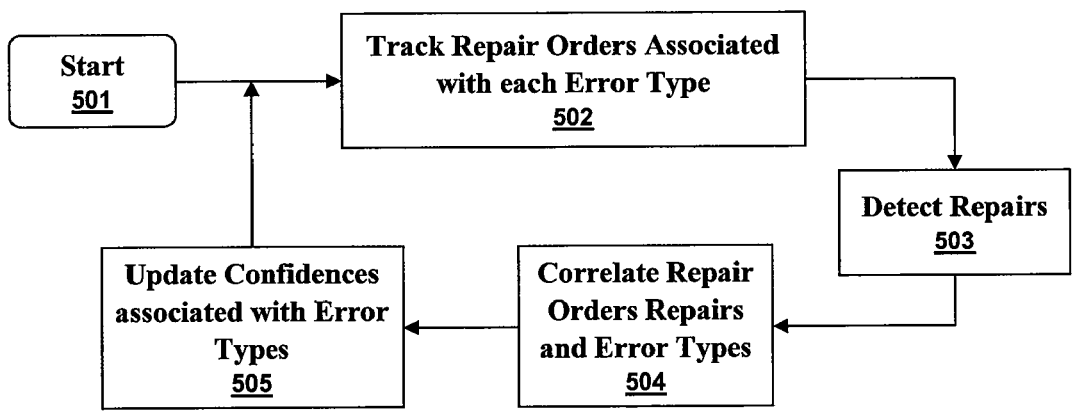
FIG. 5 illustrates a high level flow diagram of updating the confidences associated with error types in accordance with an aspect of an embodiment.

FIG. 5 illustrates a high level flow diagram of updating the confidences associated with error types in accordance with an aspect of an embodiment. After the start 501 the repair orders associated with each error type are tracked 502. Error types are associated with repair order because an error type occurrence results in a detected error that can result in a repair order and perhaps in a repair. Repairs are detected 503 and then repairs, repair orders, and error types are correlated 504. The confidences associated with the error types can then be updated 505 based on the correlations. The process repeats by looping back to tracking repair orders 502.

Figure 6:
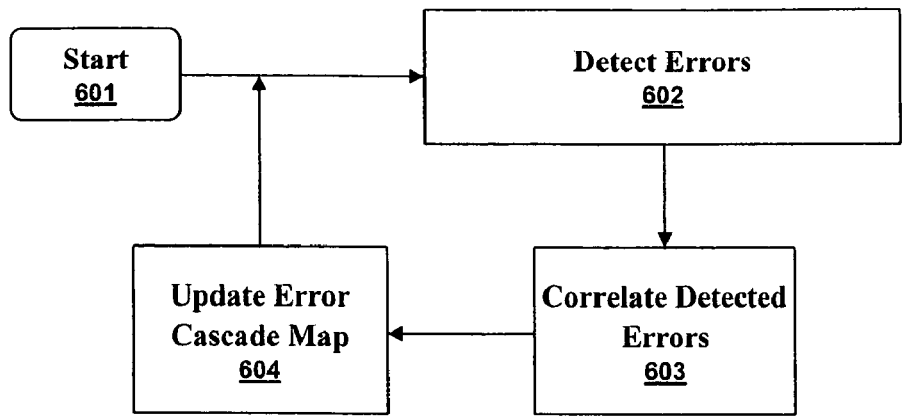
FIG. 6 illustrates a high level flow diagram of updating an error cascade map in accordance with an aspect of an embodiment.

FIG. 6 illustrates a high level flow diagram of updating an error cascade map in accordance with an aspect of an embodiment. After the start 601, errors can be detected 602 and then correlated 603 with previously detected errors. The correlation can be used to update the cascade map 604 before the process loops back to detecting errors 602. Notice that the error cascade map can also be maintained by interrogating the detected error collection. However, the detected error collection is not guaranteed to have an accurate and comprehensive assemblage of all the errors that have occurred.

Figure 7:
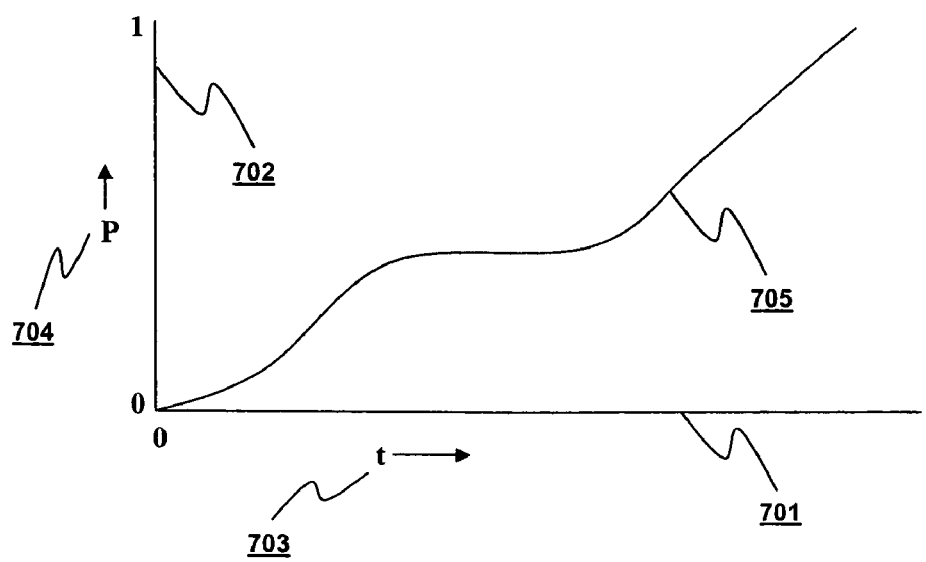
FIG. 7 illustrates a graph of probability increasing as a function of time.

FIG. 7 illustrates a graph of probability increasing as a function of time. The time axis 701 has time increasing 703 towards the right. The probability axis 702 show probability 704 increasing from 0 to 1. A probability function 705 is shown starting at 0 at time equal to 0 and increasing to 1 as time elapses. The probability function 705 is illustrative of the probability that one error type occurrence follows another within a given time period.

Figures 8, 9:
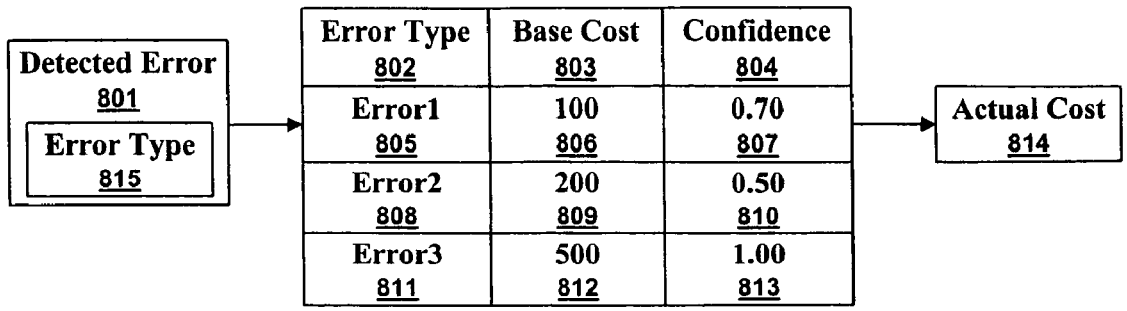
FIG. 8 illustrates producing an actual cost in accordance with an aspect of the embodiments.
FIG. 9 illustrates an error cascade map in accordance with an aspect of an embodiment.
Figure 10:
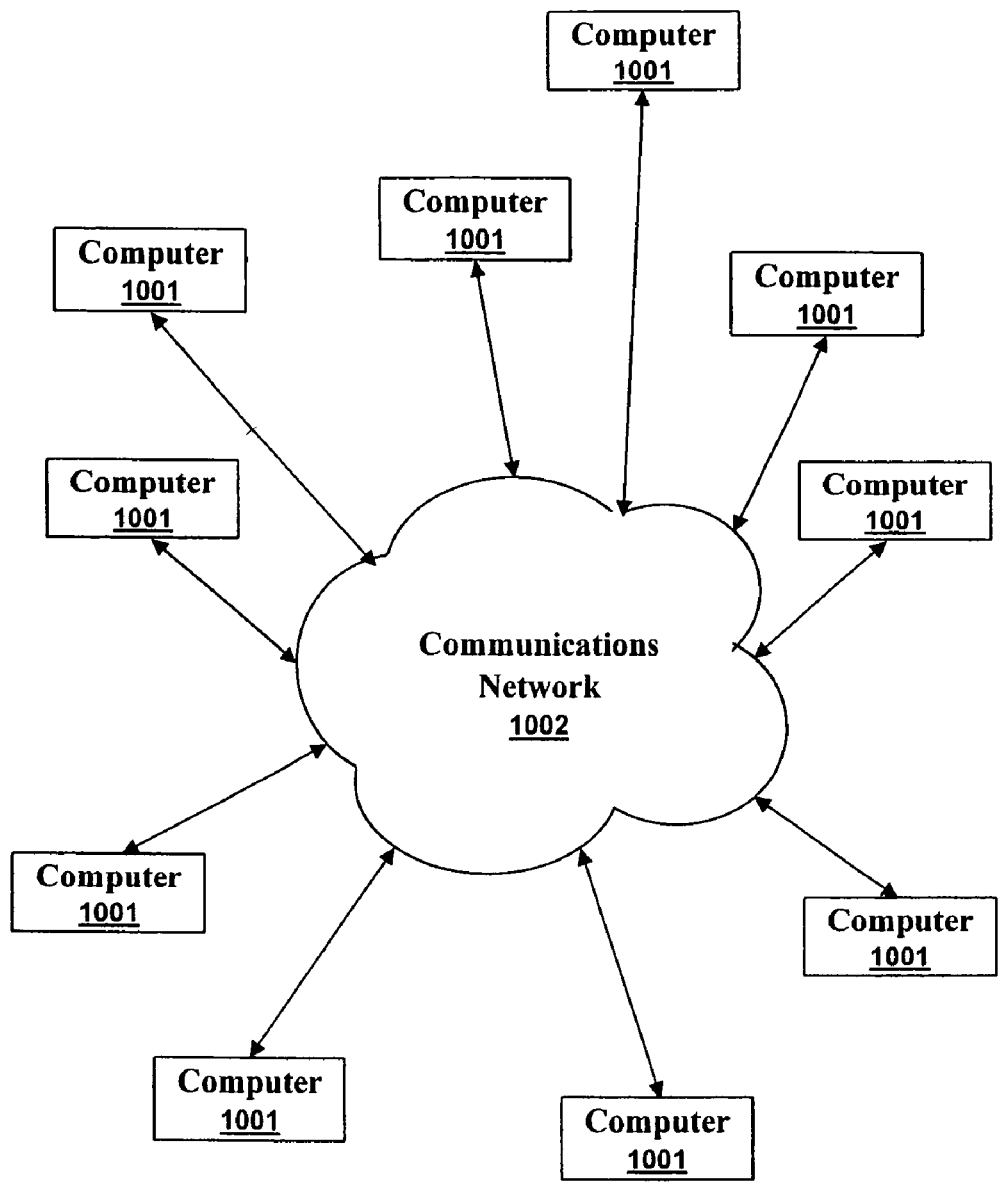
FIG. 10, labeled as "prior art", illustrates a computing system.

FIG. 8 illustrates producing an actual cost in accordance with an aspect of the embodiments. A detected error 801 has an error type 815. An error price association associates error type 802, base cost 803, and confidence 804. Error1 805 is an error type with a 100 base cost 806 and 0.7 confidence 807. Error2 808 is an error type with a 200 base cost 809 and 0.5 confidence 810. Error3 811 is an error type with a 500 base cost 812 and 1.0 confidence 813. An actual cost 814 can be produced for every error type 802, 815 and every detected error 801. If the actual cost is produced by multiplying base cost with confidence and the detected error 801 has error type 815 of Error1, the actual cost is 100*0.7=70. Similarly, Error2 has actual cost 100 and Error3 has actual cost 500.

FIG. 9 illustrates an error cascade map 916 in accordance with an aspect of an embodiment. Causing errors 901 are estimated to cause resulting errors 902 with a cascade probability 903. Error1 904 is estimated to cause Error2 905 0.2 906 of the time. Error2 907 is estimated to cause Error3 908 0.05 909 of the time. Error1 910 is estimated to cause Error3 911 0.7 912 of the time. Error3 913 is estimated to cause Error2 914 0.1 915 of the time.

The cascade cost of Error1 can be calculated as the Error1 actual cost, 70, plus the actual costs of the cascade errors multiplied by the probability that the cascade error occurs. Error1 causes Error2 with 0.2 probability giving a cost of 0.2*100=20. The probability of Error1 causing Error2 causing Error3 is 0.2*0.05=0.01 resulting in a cost of 0.01*500=5. Error1 can also directly cause Error3 resulting in a cost of 0.7*500=350. The probability of Error1 causing Error3 causing Error2 is 0.7*0.1=0.07 resulting in a cost of 0.07*100=7. There are no more possible cascade errors because Error3 causing Error2 causing Error3 can not occur unless Error3 is repaired and then caused by Error2. The Error1 cascade cost is 70+20+5+350+7=452. Other ways to compute cascade costs are also possible. For example, each error type can be counted only once using its largest cost resulting in an Error1 cascade cost of 70+20+350=440.

General

Embodiments can be implemented in the context of modules. In the computer programming arts, a module (e.g., a software module) can be implemented as a collection of routines and data structures that perform particular tasks or implement a particular abstract data type. Modules generally can be composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment" or "one embodiment" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for prioritizing repairs of a computing system of networked computers comprising:
   associating a base cost and a confidence with each one of at least one error type that can impact the performance of the computing system such that an actual cost for each one of the at least one error type can be produced with at least one computer using the associated base cost and the associated confidence, wherein the associated confidence is a value indicating the degree to which the base cost associated with a respective error type is accurate;
   detecting an occurrence of any one of the at least one error type with at least one computer, creating a detected error associated with the error type that occurred, and using the detected error to update a detected error collection wherein the detected error collection comprises one or more detected errors;
   using the actual cost of the error type associated with each detected error in the detected error collection to create one or more repair orders with at least one computer; and
   detecting one or more repairs with at least one computer and updating the detected error collection accordingly.

2. The method of claim 1 further comprising updating the confidence associated with the error type associated with the one or more repair orders based on a time to repair metric.

3. The method of claim 1 wherein the actual cost is the base cost multiplied by the confidence.

4. The method of claim 2 further comprising detecting an absence of a previously detected error, inferring that the previously detected error has been repaired and thereby detecting at least one of the one or more repairs by inference.

5. The method of claim 1 wherein the detected error collection is an ordered queue of the detected errors and further comprising ordering the detected errors in the detected error collection based on the actual cost of the detected errors.

6. A method for prioritizing repairs of a computing system of networked computers comprising:
   associating a base cost and a confidence with each one of at least one error type that can impact the performance of the computing system such that an actual cost for each one of the at least one error type can be produced with at least one computer using the associated base cost and the confidence, wherein the associated confidence is a value indicating the degree to which the base cost associated with a respective error type is accurate;
   producing with at least one computer an error cascade map associating at least one causing error with at least one resulting error to produce at least one cascade association and associating a cascade probability with each one of the at least one cascade association wherein the causing error is one of the at least one error type, the resulting error is one of the at least one error type, and the cascade probability indicates the likelihood that the causing error will cause the resulting error to occur and wherein a cascade cost for each one of the at least one error type can be produced with at least one computer from the error cascade map and the actual cost of each of the at least one error type;
   detecting an occurrence of any one of the at least one error type with at least one computer, creating a detected error associated with the error type that occurred, and using the detected error to update a detected error collection wherein the detected error collection comprises one or more detected errors;
   using the cascade cost of the error type associated with each detected error in the detected error collection to create one or more repair orders with at least one computer; and
   detecting one or more repairs with at least one computer and updating the detected error collection accordingly.

7. The method of claim 6 wherein the cascade cost for each one of the at least one error type is produced by multiplying the cascade probability from the error cascade map by the actual cost of each of the at least one error type.

8. The method of claim 6 wherein the cascade probability is a function of elapsed time from the occurrence of the causing error.

9. The method of claim 6 further comprising updating the confidence associated with the error type associated with the one or more repair orders based on the elapsed time between repair orders and repair performance.

10. The method of claim 6, wherein the cascade cost of the error type is calculated by combining the actual costs of all of the cascaded error types.

11. The method of claim 9 further comprising detecting an absence of a previously detected error, inferring that the previously detected error has been repaired and thereby detecting one or more of the one or more repairs by inference.

12. The method of claim 6 wherein the detected error collection is an ordered queue and further comprising ordering the detected error collection based on the cascade cost of the detected errors.

13. A system for prioritizing repairs of a computing system comprising:
   at least two computers in the computing system wherein each of the at least two computers can communicate with any of the at least two computers via a communications network;
   at least one error type wherein an error type identifies one of at least one error that impacts the performance of the computing system and an error price association wherein each of the at least one error type is associated with a base cost and a confidence such that an actual cost can be produced for each one of the at least one error type, wherein the associated confidence is a value indicating the degree to which the base cost associated with a respective error type is accurate;

a detected error collection comprising one or more detected errors wherein each of the at least one detected errors has an error type;

at least one error detection module that detects an occurrence of at least one error and updates the detected error collection based on the at least one error;

a repair assignment module that examines the detected error collection and creates one or more repair orders that cause one or more repairs wherein each one of the one or more repairs is associated with one or more of the one or more repair orders; and a repair detection module that detects an occurrence of at least one repair and updates the detected error collection.

14. The system of claim 13 further comprising at least one actual cost wherein each one of the at least one actual cost is associated with one of the at least one error type, wherein each one of the at least one actual cost is produced from the error price association, wherein each one of the one or more detected errors has an actual cost, and wherein the repair assignment module prioritizes the one or more repair orders based on the actual cost of each one of the one or more detected errors.

15. The system of claim 13 further comprising:

an error cascade map comprising one or more cascade elements comprising a causing error, a resulting error, and a cascade probability wherein the causing error is one of the at least one error type, the resulting error is one of the at least one error type, and the cascade probability is the probability that the resulting error will follow the causing error; and at least one cascade cost wherein each one of the at least one cascade cost is associated with one of the at least one error type, wherein each one of the at least one cascade cost is produced from the error price association and the error cascade map, wherein each one of the one or more detected errors has a cascade cost, and wherein the repair assignment module prioritizes the one or more repair orders based on the cascade cost of each one of the one or more detected errors.

16. The system of claim 15 further comprising error correlations wherein the error correlations are produced from the detected error collection and wherein the error correlations are used to update the error cascade map.

17. The system of claim 15 wherein the cascade probability is a function of elapsed time from the occurrence of the causing error.

18. The system of claim 13 further comprising a confidence module that tracks the one or more repair orders and the one or more repairs and updates the error price association.

19. A system for prioritizing repairs of a computing system comprising:

a means of computing comprising at least two computers that can communicate over a communications network;

a means of detecting at least one error in the means of computing and assigning a cost to each one of the at least one error based upon a base cost and a confidence associated with each at least one error, wherein the associated confidence is a value indicating the degree to which the base cost associated with a respective error is accurate;

a means of tracking the at least one error;

a means of prioritizing and assigning at least one repair wherein each one of the at least one repair removes at least one of the at least one error; and a means of detecting the completion of each one of the at least one repair.

20. The system of claim 19 further comprising a means of determining a probability that at least one cascade error will result from each one of the at least one error and a means of assigning a cascade cost to each one of the at least one error based upon the probability.

21. The method of claim 1, wherein the computing system is a computer cluster.

22. The method of claim 6, wherein a cascade probability is assigned to each one of two or more cascade associations.

* * * * *